(12) United States Patent
Mager

(10) Patent No.: US 6,643,371 B2
(45) Date of Patent: Nov. 4, 2003

(54) METHOD AND APPARATUS FOR ALPHANUMERIC DATA ENTRY

(75) Inventor: Gary N. Mager, Seattle, WA (US)

(73) Assignee: Wildseed Ltd., Kirkland, WA (US)

( * ) Notice: Subject to any disclaimer, the term of this patent is extended or adjusted under 35 U.S.C. 154(b) by 229 days.

(21) Appl. No.: 09/944,640

(22) Filed: Aug. 31, 2001

(65) Prior Publication Data

US 2003/0048894 A1 Mar. 13, 2003

(51) Int. Cl.[7] .............................................. H04M 1/00
(52) U.S. Cl. ................... 379/355.07; 379/379; 379/368
(58) Field of Search ................... 379/355.01, 355.05, 379/355.07; 455/550, 566, 564; 345/168, 169, 173

(56) References Cited

U.S. PATENT DOCUMENTS

| | | | |
|---|---|---|---|
| 5,592,546 A | | 1/1997 | Takahashi |
| 5,982,876 A | | 11/1999 | Albesa |
| 6,046,732 A | * | 4/2000 | Nishimoto ................... 345/168 |
| 6,097,808 A | | 8/2000 | Chang |
| 6,483,913 B1 | * | 11/2002 | Smith ..................... 379/355.07 |

* cited by examiner

Primary Examiner—Forester W. Isen
Assistant Examiner—Jefferey Harold
(74) Attorney, Agent, or Firm—Schwabe, Williamson & Wyatt, PC

(57) ABSTRACT

On a communication device, letters A to Z are assigned to data entry keys of a data entry keypad (330), and the letters assigned to each of the data entry keys are advantageously arranged in accordance with the frequency of occurrence of the letters in use. Numeric digits are assigned to the data entry keys in the conventional way. A controller (410) detects activation of each data entry key on the keypad (330) by a user, and also detects the number of times the data entry key is activated. The controller (410) then accesses a key map (415) in memory to determine the letter or numeric digit selected by the user. From the assignment of the letters to the data entry keys and the corresponding mapping (415) in the memory, the letters having a higher probability of occurrence are selected by a single activation of the data entry keys and, letters with a lower probability of occurrence are selected by activating the data entry keys two or more times. The standard correspondence between numeric keys and letters of the alphabet is maintained for compatibility when entering mnemonic phone numbers and generating DTMF signals.

44 Claims, 6 Drawing Sheets

| DATA ENTRY KEY / NO. OF CLICKS | 2 | 3 | 4 | | 9 |
|---|---|---|---|---|---|
| 1 | A | D | G | | W |
| 2 | B | E | H | | X |
| 3 | C | F | I | | Y |
| 4 | 2 | 3 | 4 | | Z |

*FIG. 2 (PRIOR ART)*

METHOD AND APPARATUS FOR ALPHANUMERIC DATA ENTRY

FIELD OF THE INVENTION

The present invention relates to a user input device for entering alphanumeric data on a device having relatively few data entry keys, and more particularly to a keypad for entering alphanumeric data on a portable communication unit.

BACKGROUND OF THE INVENTION

Portable electronic devices with text entry capabilities are increasing in usage. These devices are being built in smaller sizes each year. For many of these devices, such as cellular phones, models that are small in size are perceived as desirable by consumers. Cellular phone manufacturers have responded to this, and produce a variety of cellular phones that are small relative to earlier models, with some models being smaller than the size of a user's palm.

Cellular phones have a number of features that require a user to input alphanumeric characters. A user may, for example, enter alphanumeric text in the name field of a phone list maintained in the phone. A user may also use a cell phone to send text messages via short messaging service (SMS) technology. To do this, a user generally inputs alphanumeric characters into the phone. Typically, a numeric keypad is used to enter alphanumeric characters, where the number of alphanumeric characters exceeds the number of numeric input keys.

A technique generally used to enter alphanumeric characters into a phone uses a standard alphabetic arrangement illustrated in FIG. 1. In this method a cellular phone has two data entry modes, a numeric mode and an alphanumeric mode. In the numeric mode, activation of the data entry keys represents numeric digits. The numeric digits are determined from the correspondence between each data entry key and the numeric digit associated with that key. In a standard telephone, activation of data entry keys in numeric mode generates dual tone multifrequency (DTMF) signals in accordance with an industry standard.

When operating in the alphanumeric mode, single activation of a data entry key is interpreted as a user selection of the first letter in the sequence of letters that are assigned to the particular data entry key. Similarly, when a data entry key is activated twice by a user, this is interpreted as a selection of the second letter in the sequence of letters associated with that particular data entry key. A timeout threshold is used to determine when selection of a character is complete. If a period of time equal to the timeout threshold follows the activation of a key without a subsequent activation of a key, the selection of the character is considered to be completed. Also, if the user activates a first key followed by an activation of a different key, the activation of the second key is considered to be the beginning of the selection of a new character.

With this method, a user may activate a key one, two, three, or four times in order to select a particular letter of the alphabet. Multiple activations of keys increase the time required to enter text using the keypad.

In addition to use of the keys to enter alphanumeric data, letters on keys assist users in entering telephone numbers or other numeric data. Some telephone numbers are represented by mnemonic phone numbers, in which at least part of the phone number is specified by the use of letters, to assist in memorization of the number. For example, 1-800-ABCDEFG is equivalent to 1-800-2223334, when a user activates each key once for each number or letter in the mnemonic phone number.

Because entry of alphanumeric characters on a limited keypad is less efficient than on a full sized keyboard, a mechanism for improving the efficiency is desirable. Changes to increasing efficiency can be problematic because users are familiar with the standard key mapping. Also, the use of mnemonic telephone numbers is a further consideration.

BRIEF SUMMARY OF THE INVENTION

The present invention provides an apparatus for data entry of a plurality of letters of an alphabet. In one aspect of the invention, the apparatus includes a plurality of data entry keys and a memory having a key mapping. The key mapping represents a correspondence between each of the data entry keys and a corresponding ordered set of letters based on an alphabetical ordering of the plurality of letters. The ordering of letters within each ordered set is based on a decreasing frequency of use of each character. The apparatus also includes a processor coupled to the memory and the data entry keys, the processor receiving signals representing activations of one of the data entry keys. The processor determines a selected character corresponding to the activations of the data entry key, based on the key mapping and the signals representing activation, wherein the number of activations corresponding to the selected character is based on the position of the selected character within its respective group.

In another aspect of the invention, the letters within each group of letters are adjacent to each other in the alphabet. Each letter within a group of letters precedes each letter within a group associated with a higher numbered data entry key.

In yet another aspect of the invention, at least one group of letters comprises an ordered set of letters in order of decreasing frequency of use and is not in alphabetical order. In an additional aspect of the invention, most of the groups of letters comprise an ordered set of letters in order of decreasing frequency of use and not in alphabetical order.

In yet another aspect of the invention, an indicia for each letter is located in physical association with a corresponding data entry key.

In still another aspect of the invention, each data entry key has a corresponding ordered set of letters, a selected letter is determined to be a first letter of the ordered set of letters if one activation of the data entry keys is detected, the selected letter is determined to be the second letter if two activations of the data entry keys are detected, and the selected letter is determined to be the third letter if three activations of the data entry keys are detected.

In yet still another aspect of the invention, the apparatus includes 8 data entry keys, each key having 3 or more letters in a corresponding ordered set of letters.

In a further aspect of the invention, the apparatus includes a transmitter that transmits a sequence of characters, wherein each character of the sequence of characters is determined by the processor in response to a sequence of activations of the data entry keys.

In a still further aspect of the invention, a device receives signals representing activations from a plurality of input keys, and a selected character is determined based on a key mapping. The key mapping maps each input key and each activation count to a letter corresponding to the input key. The letters are ordered on the input keys in decreasing order of frequency of use.

In yet another further aspect of the invention, the group of letters corresponding to each input key is compatible with a conventional telephone keypad. The groups are in an alphabetical order relative to each other.

In still yet another further aspect of the invention, a device is remote from the input keys and receives signals through a wireless transmission. The device can select from a number of key mappings, including a key mapping that is transmitted from a unit containing the input keys.

In yet another further aspect of the invention, the data entry keys have a numeric association and an ordered set of letters from the following group: (2—A, C, B), (3—E, D, F), (4—I, H, G), (5—L, K, J), (6—O, N, M), (7—S, R, P, Q), (8—T, U, V), and (9—Y, W, Z, X).

These and various other features as well as advantages, which characterize the present invention, will be apparent from a reading of the following detailed description and a review of the associated drawings.

BRIEF DESCRIPTION OF THE DRAWINGS

An embodiment of the present invention will now be fully described, by way of example, with reference to the drawings of which:

FIG. 2 is a table showing the correspondence between data entry keys and activation counts in the conventional communication device of FIG. 1.

DETAILED DESCRIPTION OF THE INVENTION

The present invention provides a keypad and a key mapping for the entry of alphanumeric characters. Letters are assigned to data entry keys of a keypad in accordance with the frequency of occurrence of each letter. Hence, letters with a higher frequency of occurrence require less key activations than letters with a lower frequency of occurrence. This advantageously improves the efficiency of data entry as the frequently used letters are more easily selected by a user. Additionally, letters also correspond to numeric keys using a standard association, in order that phone numbers can be easily dialed using their mnemonic representation, and to take advantage of users' knowledge of alphabetical ordering when locating letters on the keypad.

In the following description, numerous specific details are set forth to provide a thorough understanding of embodiments of the invention. However, the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" means that a particular feature, structure, or characteristic described in connection with the embodiment is included in at least one embodiment of the present invention. Thus, the appearances of the phrase "in one embodiment" are not necessarily all referring to the same embodiment, though they may. Furthermore, the particular features, structures, or characteristics may be combined in any suitable manner in one or more embodiments.

Figure 1:
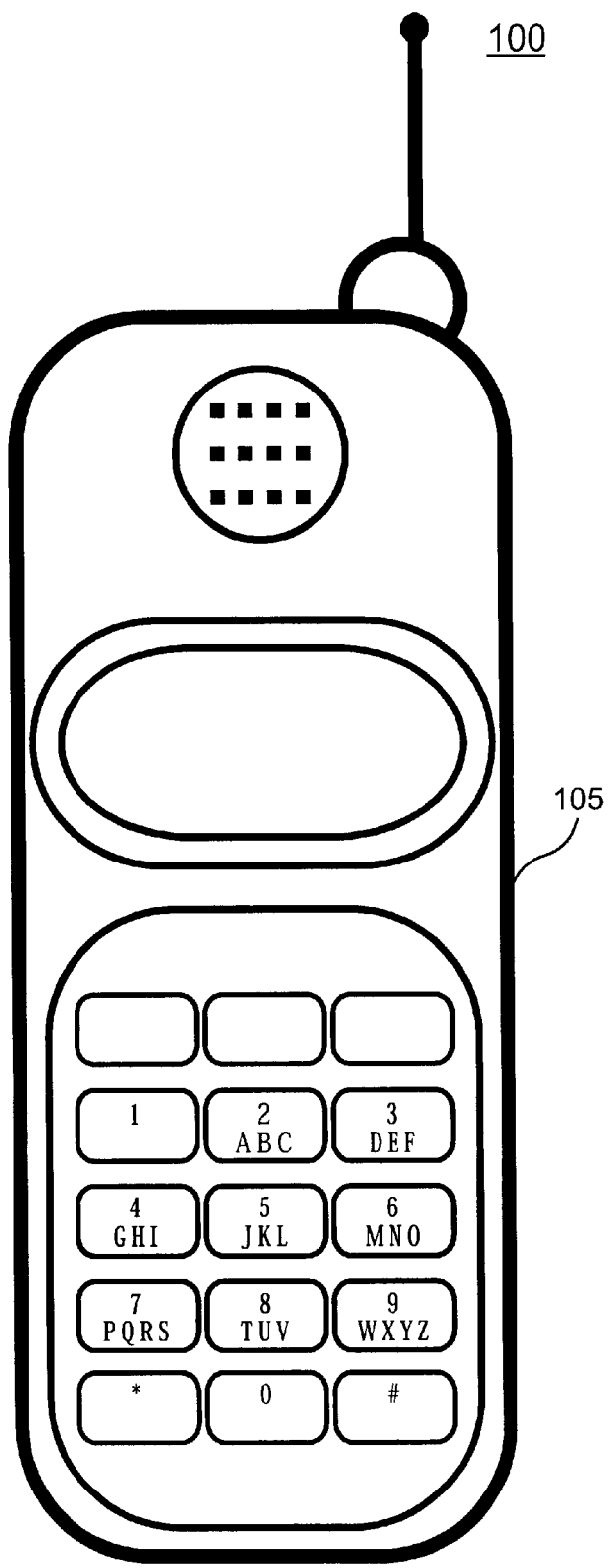
FIG. 1 illustrates a conventional portable communication device with a keypad.
Figure 2:
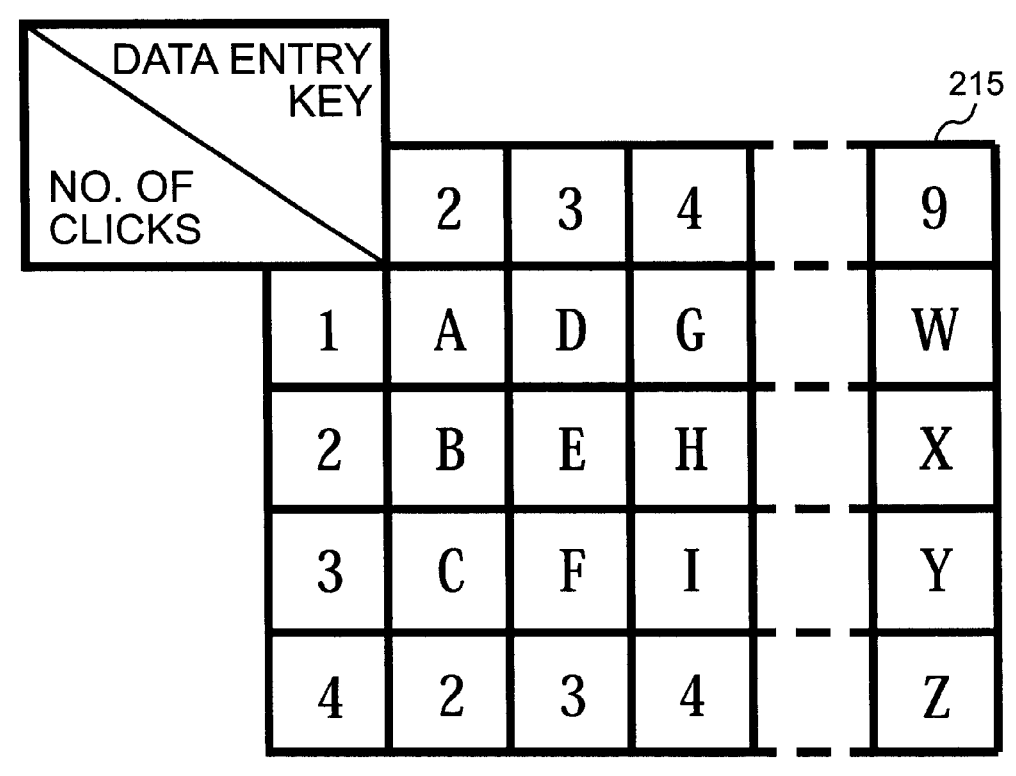

FIG. 1 illustrates a cellular phone 100 with a conventional keypad 105 where the twenty-six letters, A to Z, are assigned to eight numeric keys having corresponding numbers two to nine. The keypad 105 provides a graphic display of the letters and numeric digits that are assigned to the keys. FIG. 2 depicts a key map 215 that illustrates required key activation, when operating in alphanumeric mode. Thus, for example, one activation of the input key corresponding to the number two results in a selection of the letter "A", two activations of the input key corresponding to the number two results in a selection of the letter "B", three activations of the input key corresponding to the number two results in a selection of the letter "C", and four activations of the input key corresponding to the number two results in a selection of the digit "2".

Figure 3:
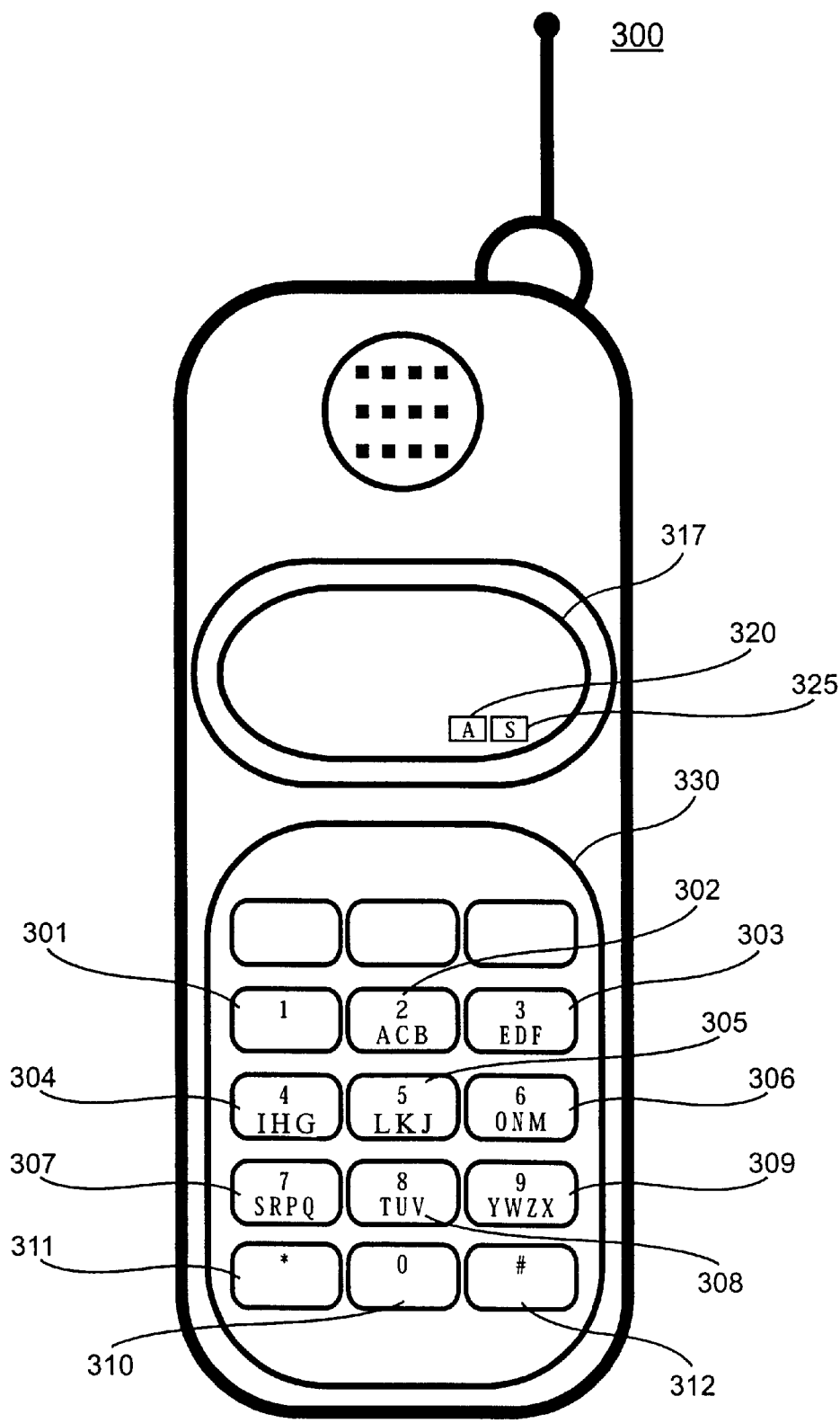
FIG. 3 illustrates a portable communication device with a keypad in accordance with the present invention.

With reference to FIG. 3, in accordance with one embodiment of the present invention, a mobile electronic communication device, specifically a cellular telephone 300, includes a keypad 330 where the twenty-six letters of the alphabet, A to Z, are assigned to eight data entry keys that include the numeric keys "2" through "9" 302–309. The letters of the alphabet are arranged in groups, with one group of letters corresponding to each numeric key. As used herein, the term "group" refers to an unordered set of elements. For example, the group A, B, C is considered to be equivalent to the group A, C, B, while the "ordered set" A, B, C is not equivalent to the ordered set A, C, B. Also, as used herein, a "numeric" key is a key that corresponds to a numeric digit, and an "alphabetic" key is a key that corresponds to at least one letter. Numeric keys are referred to by their corresponding numeric digit. In FIG. 3, the numeric keys "two" through "nine" 302–309 are also alphabetic keys, while the numeric "zero" key 310 and "one" key 301 are not alphabetic keys.

As illustrated in FIG. 3, the letters of the alphabet are grouped and associated with each numeric key 302–309 in the following manner. The first three letters of the alphabet are associated with the "two" key 302. The next three letters of the alphabet are associated with the next numeric key in numeric order, specifically the "three" key 303. Each successive three letter grouping is associated with the next numeric key. Two variations to this procedure occur with respect to the "seven" key 307 and the "nine" key 309. Each of these keys has an associated group of 4 letters. In this manner, the group of letters corresponding to each numeric key is made up of consecutive letters of the alphabet and is equivalent to the illustrated group of letters corresponding to the corresponding numeric input key illustrated in FIG. 1. Therefore, the letter-to-key correspondence matches the standard letter-to-key correspondence illustrated in FIG. 1.

The ordering of the letters within each group, and therefore the positions of the 26 letters on each of the data entry keys 302–309 are assigned based on the frequency of occurrence of the letters. Within a group, letters with a higher frequency of use are positioned before letters with a lower frequency of use. Each of the eight alphabetic data entry keys 302-309 has multiple letters assigned in a predetermined activation sequence, where the first activation of a key selects the first letter in the sequence and a second subsequent activation, prior to a timeout, selects the second letter in the predetermined sequence, and likewise for the third and, where applicable, the fourth letter in the predetermined sequence. As used herein, frequency of occurrence, or frequency of use, refer to the frequency with which the letters occur within a representative corpus of usage.

Within each group of letters, the letter with the highest frequency of occurrence is assigned the first position in the predetermined sequence for each of the data entry keys. Remaining letters are assigned to a second, third, or fourth position based on their frequency of use relative to other letters within the same group. In particular, in one embodiment, the letters A, E, I, L, O, S, T and Y are assigned the first position within their respective groups, the letters C, D, H, K, N, R, U and W are assigned the second position, the letters B, F, G, J, M, P, V and Z are assigned the third position, and the letters Q and X the fourth position. More specifically, in one embodiment, as illustrated in FIG. 3, the following ordered sets of letters correspond to their respective numeric keys:

A, C, B—two key 302
E, D, F—three key 303
I, H, G—four key 304
L, K, J—five key 305
O, N, M—six key 306
S, R, P, Q—seven key 307
T, U, V—eight key 308
Y, W, Z, X—nine key 309

In one embodiment, the ordered set of letters corresponding to each data entry key is represented by indicia displayed on each respective data entry key, in a sequence that indicates the content of the ordered set. In one embodiment, an ordered set of characters corresponds to each data entry key, some of the characters are represented by indicia, and one or more characters within one or more ordered sets does not have a corresponding indicia. The characters without indicia are ones having a higher corresponding activation count.

Figure 4:
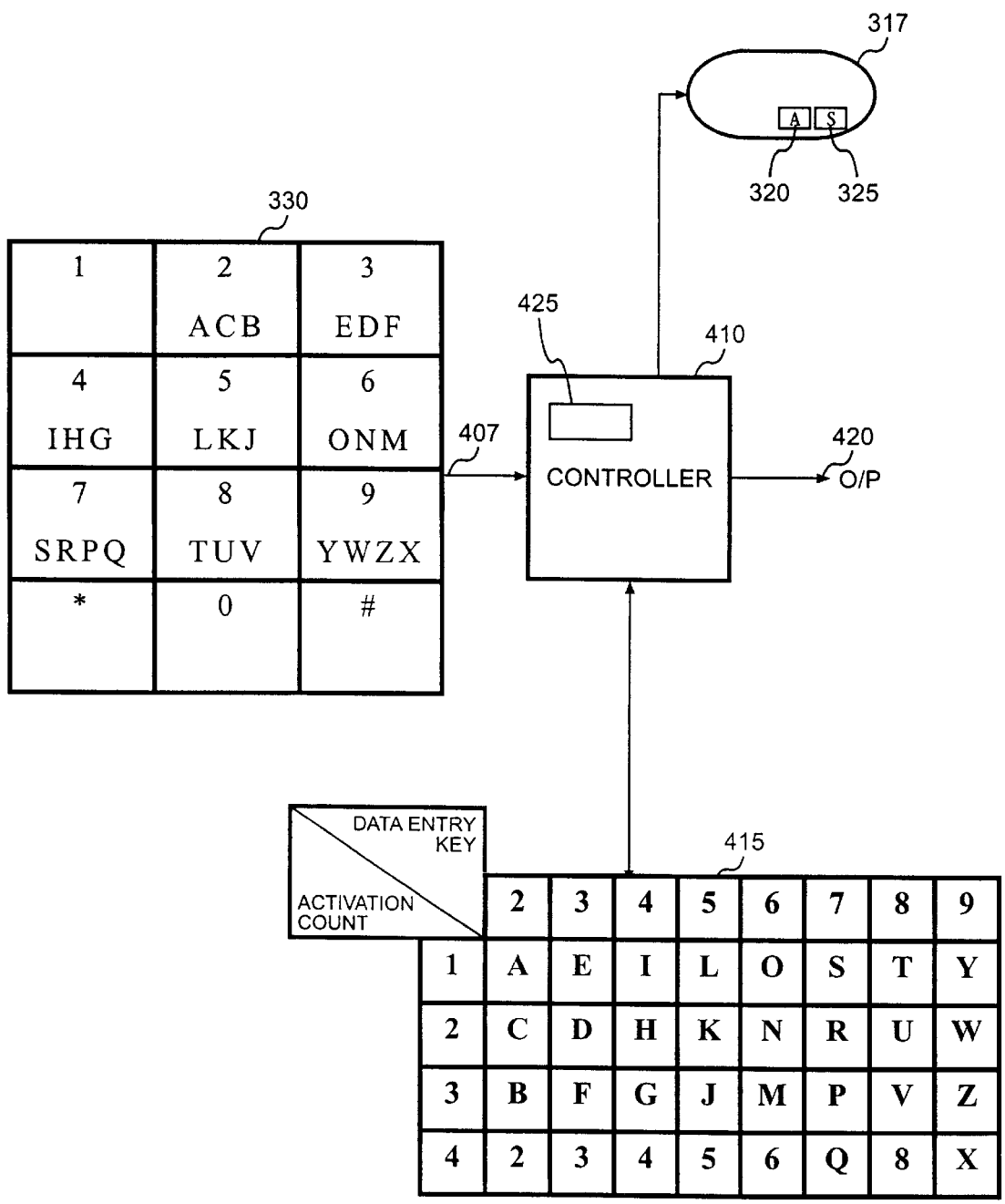
FIG. 4 is a functional block diagram including the keypad in FIG. 3.

FIG. 4 illustrates a functional block diagram corresponding to the keypad of FIG. 3. In FIG. 4, a controller 410 has a data entry mode selector module 425. The data entry mode selector module 425 contains program instructions executed by the controller 410 that detect a mode that the device is operating in. In one embodiment, the device can operate in either numeric mode or alphanumeric mode. In numeric mode, activation of each data entry key 301–312 is interpreted by the controller 410 as numeric input selections. This mode is associated with tasks such as entering a phone number to be dialed, or entering a phone number in a contact list maintained on the device. In one embodiment, when the device is operating in numeric mode, activation of each data entry key 301–312 causes a DTMF signal to be generated. Each data entry key 301–312 has a corresponding DTMF signal, unique among all data entry keys in the keypad 330, and in accordance with an industry standard for DTMF signals. In alphanumeric mode, activation of each alphabetic data entry key 302–309 is interpreted by the controller 410 as an alphanumeric input selection, as described in further detail below.

In one embodiment, data entry mode selector module 425 determines the selection between the numeric and alphanumeric modes by detecting a current task of the user. For example, when the user selects the task of generating an SMS message, the controller 410 detects the task selection, and in accordance with a pre-assigned data entry mode for this task, the data entry selector module 425 sets the controller to operate in alphanumeric data entry mode. Similarly, when the user wants to dial a telephone number or add a telephone number to a listing in the cell phone 300, and the user selects the appropriate task, for example via a selection on a displayed menu, the data entry selector module 425 sets the controller 410 to numeric data entry mode.

In one embodiment, the selection of alphanumeric mode or numeric mode is performed explicitly by a user, using a data entry mode activator, such as a button (not shown). A combination of the two mechanisms may be used, where the data entry mode selector 425 automatically selects a data entry mode based on the user task, and the user has the option of overriding the automatic selection and changing the data entry mode manually. This embodiment is useful, for example, where a user is entering a text message and wants to insert a phone number into the text. By selecting numeric mode while entering text, the entry of a phone number is made easier.

The keypad 330 has an output 407 coupled to the controller 410. When the controller 410 is operating in alphanumeric mode, the controller 410 detects each data entry key activation and the amount of time that has passed since the most recent data entry key activation, or the length of time between data entry key activations. A memory is coupled to the controller 410 and stores a key mapping 415, which includes the assignments between the physical data entry keys, the number of times a data entry key is activated, and the alphanumeric characters. The controller 410, then provides an output signal to an output 420, the output signal indicating the alphanumeric character selected by the user. In one embodiment, successive selected alphanumeric characters are stored in a memory and become a generated text string. The text string may be used to create a message, as data stored in a phone list, for notes, for entering text in a web browser, or for other uses of text strings.

In one embodiment, a display 317 is coupled to the controller 410. In one embodiment, the output signal from the controller causes the appropriate alphanumeric character to be displayed on the display 317. In one embodiment, as the user repeatedly activates an entry key and has not completed selection of a character, each successive activation causes a tentative character selection to overwrite the previous tentative character selection on the display 317.

In one embodiment, a shift selector, such as a button or switch, is provided on the device. The shift selector may be implemented in a variety of ways to allow a user to conveniently enter data in a combination of upper case and lower case. In one embodiment, activation of the shift selector specifies that the next single character selection is to be made from a set of upper case characters. Subsequent characters are selected from lower case characters, unless the shift selector is activated again. In one embodiment, activation of the shift selector specifies that the most recent previous character selection is to be converted to its corresponding upper case character. In one embodiment, upper case characters are selected by default, and the shift selector is used to specify that the next or previous character selection is a lower case character. In one embodiment, the shift mode is automatically determined based on a current activity of the user. For example, an activity may limit text input to upper case characters by automatically changing the device to upper case mode, and preventing changing of the mode. As used herein, unless explicit reference is made to an upper case character or a lower case character, specifications of a letter of the alphabet refer to the letter and to a corresponding character, which may be upper case or lower case. For example, a specification that the letter "E" is selected specifies either an upper case "E" or a lower case "e", depending on the current shift mode. Designations of a letter "E" on a key or in a key map are to be interpreted as equivalent to a designation of "e" unless explicitly stated otherwise.

In one embodiment, the display 317 receives an indicator signal from the controller 410 that indicates the mode of data entry and whether the shift function has been activated. The indicator signal switches a shift mode indicator 325 accordingly to provide a visual indication to the user as to the status of the shift function. In one embodiment, the indicator signal switches a data entry mode indicator 320 to indicate whether the operational mode is alphanumeric or numeric.

In one embodiment, the controller 410 is physically located remotely from the communication device. The communication device transmits signals representing the activation of each input key. In one embodiment, the signals are DTMF signals. The controller receives signals representing the activation of each input key, and performs a process of determining corresponding alphanumeric characters, as described below. This embodiment is useful when the controller is part of, or communicates with, a server that communicates with the communication device. In one embodiment, a remote controller has more than one key mapping, and the communication device transmits data to the controller indicating a key mapping to use. In one embodiment, the communication device transmits the key mapping to the controller, allowing each communication device to have a key mapping that is not pre-programmed into the controller. In these embodiments, the remote controller determines alphanumeric characters from a number of communication devices using more than one key mapping.

In one embodiment, the key map 415 also includes a numeric digit corresponding to each alphanumeric key, where the numeric digit is the numeric digit corresponding to the data entry key. The numeric digit corresponds to an activation count that is one greater than the activation count corresponding to the last letter in the ordered set corresponding to each data entry key. For example, activating the "two" key four times results in a selection of the digit "2". When numeric digits are included in the key map 415, their corresponding activation count is not based on frequency of use for the digit.

Figure 5:
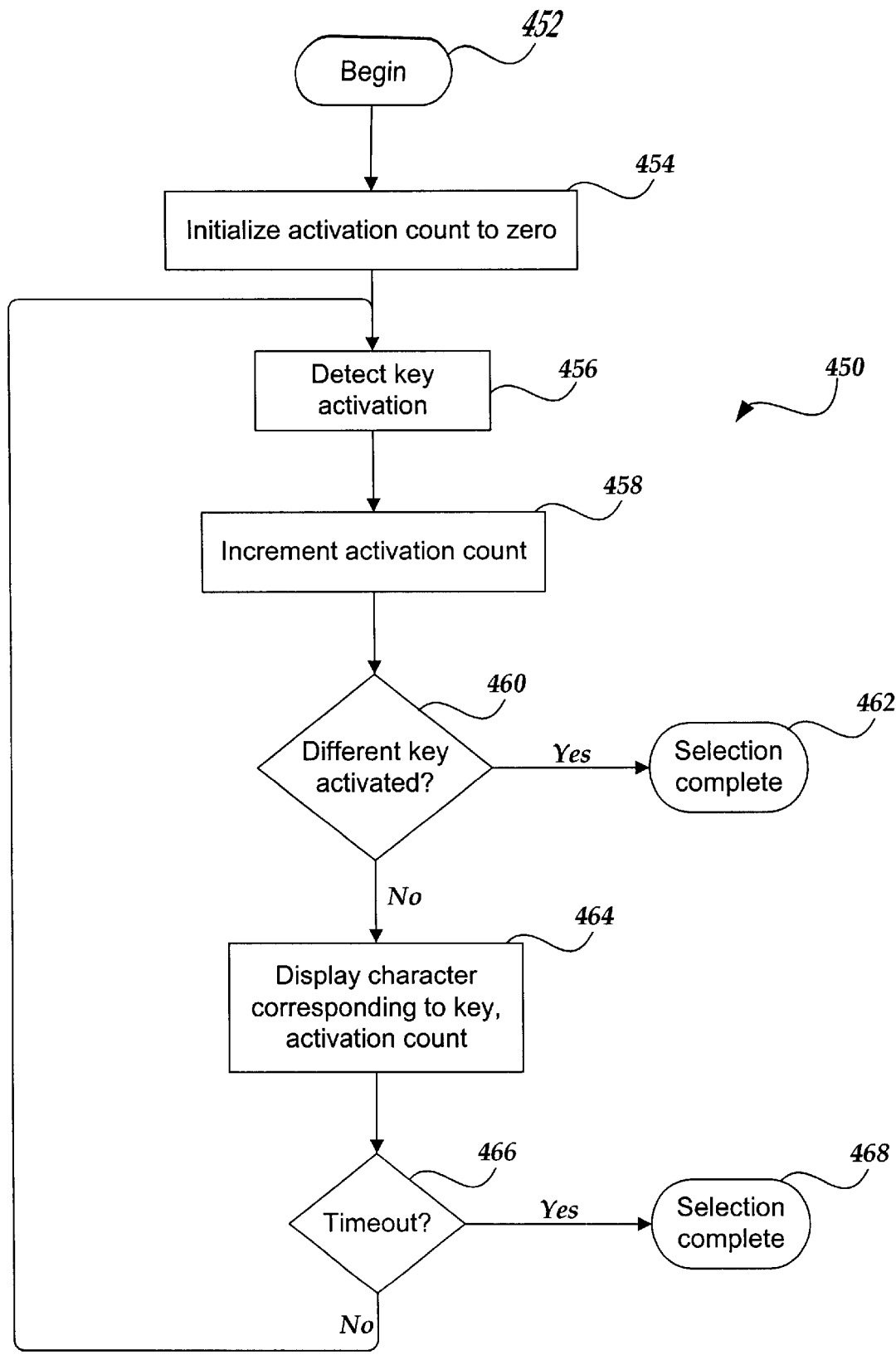
FIG. 5 is a flowchart detailing the operation related to the functional block diagram in FIG. 4.

FIG. 5 illustrates a process 450 of determining a selected alphanumeric character using the present invention. The process 450 starts at a box 452. At a step 454, an activation count corresponding to the current character selection is initialized to zero. At a step 456, the controller 410 (FIG. 4) detects an alphanumeric input key activation has occurred. The controller saves an identifier designating the input key (302–309 in FIG. 3) that has been activated. Note that the processing of non-alphanumeric input keys is not illustrated in FIG. 5.

At a step 458, the controller 410 increments the activation count. At a step 460, a determination is made as to whether the input key activated and detected at the step 456 is the same or different from an input key activated during the alphanumeric character selection of the current process 450. The first time the determination 460 is made for a process 450 of selecting an alphanumeric character, the determination is always that a different key has not been activated, and control flow proceeds to a step 464, where a character corresponding to the combination of input key and activation count is displayed.

The character to display at step 464 is determined by using the key map 415 (FIG. 4) that associates each alphanumeric character with a corresponding combination of data input key (302–309) and activation count. In the key map, each character corresponds to a unique combination of data input key and activation count. For example, if the data input key 303, corresponding to the number three, has been activated one time, the alphanumeric letter "E" is displayed. Note that the letter "E" may be displayed in lower case or upper case, depending on the current shift mode.

After displaying a character at a step 464, a determination is made of whether a next input key activation is made prior to a predetermined timeout threshold elapsing between the prior key activation detection 456 and a next input key activation detection. If a period of time equal to or greater than the predetermined timeout threshold occurs, character selection is complete and flow proceeds to a step 468.

If a next input key activation is made prior to the timeout threshold occurring, flow control loops to the step 456. The steps as described above then repeat. On second and subsequent passes through the sequence of steps 456–466, at the step 460, the determination of whether a different input key has been activated may be positive. If this is true, flow control moves to a step 462, where the alphanumeric character selection is complete. In this situation, after the step 462 and associated processing of the character selection are completed, the process 450 starts again for the new character selection. The key activation detected at the step 456 for the new character is the different key that was detected at the step 460 for the processing of the previous character. The step 460 therefore allows only consecutive activations of an input key to be considered during the process 450 of determining a selected alphanumeric character.

In one embodiment, the key detection at step 456 only proceeds as illustrated when the key detected is one of a limited set of data entry keys. Activation of keys outside of the limited set are processed outside of the process 450, and flow returns to the step 456 when a key activation within the limited set is detected. In this embodiment, the detection of consecutive activations is therefore relative to the limited set of data entry keys.

At the step 464, the controller 410 accesses the key map 415 in the memory with an indication of the input key activated by the user and the number of times the key has been activated, and determines from the key map a tentative character selected by the user. This tentative character is displayed. Upon reaching the completion of the character selection (step 462 or 468), the tentative character becomes the actual character selection. The controller 410, then provides an output signal to an output 420, where the output signal indicates the character selected by the user.

In one embodiment, when the data entry mode is explicitly selected by a user, the controller detects the activation and toggles between numeric mode and alphanumeric mode. As discussed above, in one embodiment, a data entry mode actuator is not provided, and the mode of operation is determined based on the task that the user is performing. Dependent on the mode of operation of the controller 410, the activation of the data entry keys are interpreted by the controller 410 either as selection of numeric digits or selection of alphanumeric characters, by the user.

In numeric mode, the activation of a data entry key is interpreted as a numeric selection by the user. In numeric mode, an activation count is not kept, and each input key activation indicates the selection of one digit.

In the alphanumeric mode, the activation of the data entry keys and the number of times a particular data entry key is activated by a user are interpreted as alphanumeric selections by the user.

In alphanumeric data entry mode, the shift function is operational. Hence, when the controller 410 detects that the user has activated the shift function, by selection of a shift selector and the like, the controller 410 interprets data entry with respect to an alternate set of characters. The controller selects an upper case character or a lower case character corresponding to the selected letter, depending on the current shift mode.

In one embodiment, at the step 458, when the activation count becomes greater than the highest activation count corresponding to an alphanumeric character for the selected data entry key, the activation count is reset to one. In this way, the activation count wraps around, so that continuous activation of a single data entry key repeatedly cycles through the alphanumeric characters corresponding to the data entry key. In one embodiment, the key map 415 contains additional characters that may not be represented by indicia on the data entry keys 302–309. The additional characters correspond to activation counts greater than those for alphanumeric characters represented by indicia.

One advantage of the present invention is that mnemonic phone numbers, such as 1-800-ABCDEFG, and the like, can be entered in the same manner as with a conventional telephone because the correspondence between each letter and numeric key is compatible. The DTMF signal corresponding to each number is the same as for the standard phone of FIG. 1. Additionally, the DTMF signal corresponding to each letter is the same as for the phone of FIG. 1, even though the ordering of letters on each key, the key mapping, and the activation sequence is advantageously arranged, based on the frequency of use of letters, in accordance with the present invention.

Another advantage of the present invention is that, by maintaining compatibility between each letter and its corresponding numeric key, users can easily locate each letter, based on their knowledge of the alphabet and on conventional key mappings. Novice users quickly find the correct key to activate to select a desired letter without having to scan the keys as they might if the correspondence between letters and entry keys had not been maintained.

Figure 6:
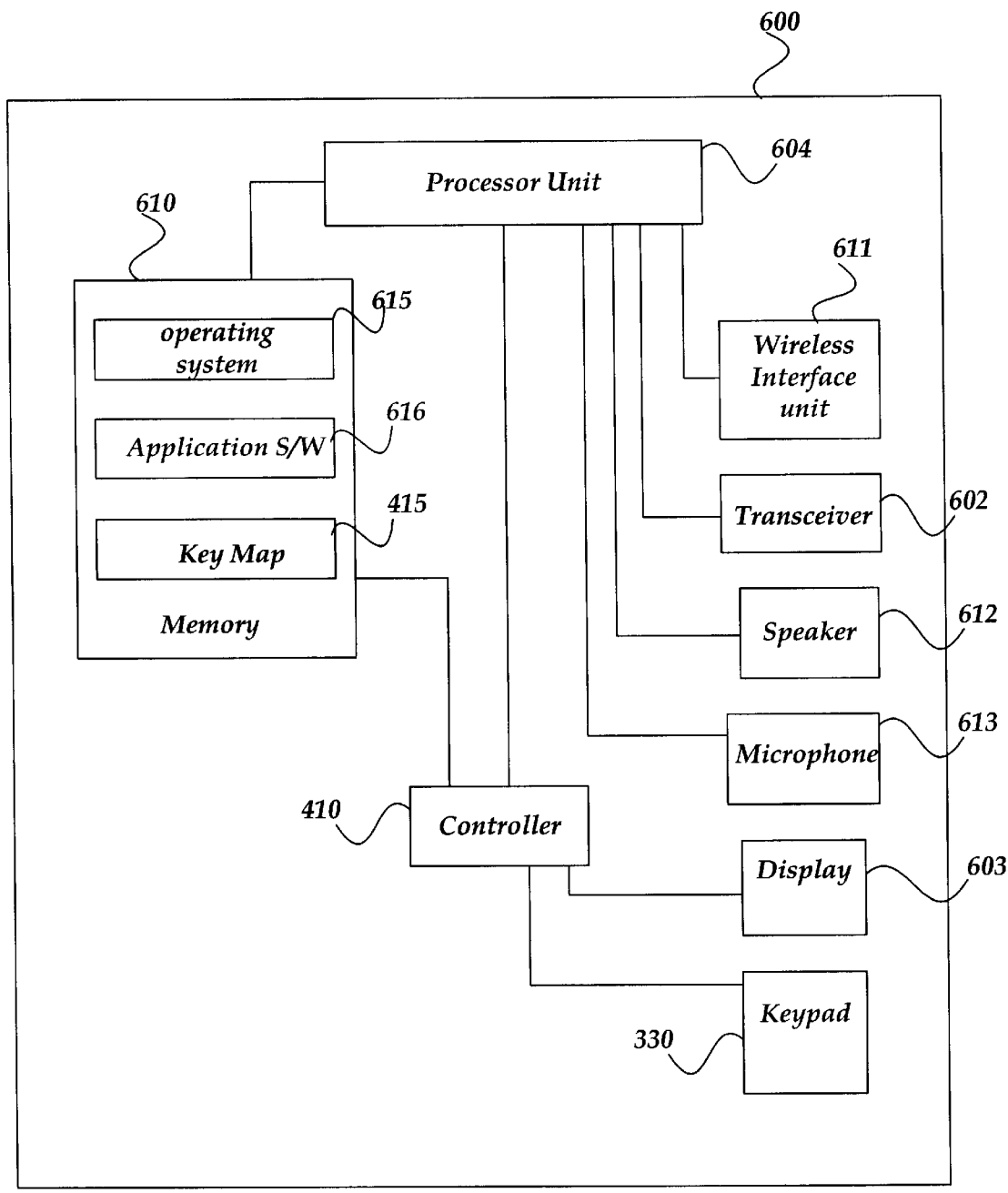
FIG. 6 is a block diagram of an exemplary portable communication device incorporating the present invention.

FIG. 6 illustrates one embodiment of a mobile electronic communication device 600 incorporating the present invention. The cellular phone 100 of FIG. 1 is one example of a mobile electronic communication device. Pagers, PDAs, and handheld messaging devices are additional examples of mobile electronic communications devices within which the present invention can be practiced. In this embodiment, the mobile electronic communication device 600 includes a transceiver 602, a display 603, a processor unit 604, a keypad 330, memory 610, a wireless interface unit 611, an audio speaker 612, a microphone 613, an operating system 615, and application software 616. In this exemplary embodiment, operating system 615 and application software 616 are stored in memory 610. In the embodiment illustrated in FIG. 6, memory 610 also stores the key map 415 (FIG. 4). As discussed above, a controller 410 (FIG. 4) is coupled to the memory 610 and employs the key map 415. In one embodiment, the controller 410 is implemented as instructions stored in memory 610 that are processed by processor unit 604. In one embodiment, controller 410 is implemented using a second processor and a second memory. Memory 110 may also be implemented as more than one memory component. Typically, memory 110 is implemented as a combination of a read-only memory component and a writable memory component.

In one embodiment, transceiver 602, display 603, keypad 330, memory 610, wireless interface unit 611, speaker 612, and microphone 613 are connected to processor unit 604. Processor unit 604 sends and receives commands from the operating system 615. The operating system 615 in conjunction with the processor unit 604 controls the application software 616. In one embodiment, keypad 330 is connected to the controller 410, which receives input signals when keys on the keypad are activated.

In operation, transceiver 602 is used to receive messages as in known mobile electronic communication devices, for example short message service (SMS), code division multiple access (CDMA), time division multiple access (TDMA), global system for mobile communications (GSM), and general packet radio service (GPRS). The wireless interface unit 611 operates in conjunction with the transceiver 602 to send and receive information. The audio speaker 612 converts the signals received from the transceiver 602 to sound. Display 603 is used to display text and/or images. In one embodiment, display 603 is an LCD. Processor unit 604 stores received message information in the memory 610. Processor unit 604 also controls display 603 to display the stored message information or other data from memory 610.

The present invention, as described, provides a keypad for efficient entry of letters, and combinations of letters and numeric digits. A single activation of the data entry keys selects letters that are more frequently used, and multiple activation of the data entry keys select letters that are less frequently used. The key mapping illustrated in FIGS. 3 and 4 is one embodiment of the present invention. In other embodiments, the precise ordering of alphanumeric characters on each input key may vary from the illustrated one, and still achieve benefits of the present invention, by generally placing more frequently used alphanumeric characters in positions that require less activations than those of less frequently used alphanumeric characters. Some devices may have one or more specific uses that vary the frequency of alphanumeric character uses. With these devices, the preferred order of characters on each input key may vary according to the frequency of their usage and the teachings of the present invention. Alternatively, on some devices, the exact key mapping may not be optimal for the particular usage of the device, but may vary in order to maintain a common key mapping with other devices in which the present invention is practiced.

For a given language, for example English, this is implemented by determining the frequency of use, sometimes referred to as the probability of occurrence, of each of the letters of the language. The letters are grouped in a manner compatible with standard telephone keypads, and the letters are ordered on each numeric key in order of decreasing frequency of use. Thus, the present invention, as described, advantageously makes user entry of the more frequently used letters more convenient and more efficient.

In one embodiment, the frequency of use of each letter is determined with respect to a corpus of usage representing general usage in a language. A table of probability of usage derived in this manner is included in "One-Gram Probability Distribution" from Alan G. Konheim's "Cryptography—A Primer," John Wiley, 1981, p. 16. This work cites the letters of the English alphabet as the following, in decreasing order of frequency of use:

E, T, A, O, N, R, I, S, H, D, L, F, C, M, U, G, P, Y, W, B, V, K, X, J, Q, Z

In one embodiment, the above order of frequency of use is used to create the following ordered sets of letters corresponding to their respective numeric keys:

A, C, B—two key
E, D, F—three key
I, H, G—four key
L, K, J—five key

O, N, M—six key
R, S, P, Q—seven key
T, U, V—eight key
Y, W, X, Z—nine key

In variations of the embodiment illustrated in FIGS. 3 and 4, any one or more of the above ordered sets can be substituted for the ordered sets illustrated in these figures.

In one embodiment, the frequency of use of each letter is determined with respect to a corpus of usage of portable electronic devices that do not have a complete alphanumeric keyboard, a complete alphanumeric keyboard being one that allows each letter to have an input key distinct from each other letter. The frequency of use of letters on such devices varies from the frequency of use in the general language. For example, users of such devices often use abbreviations. They also use numbers to replace parts of words, such as using "SK8" in place of "SKATE." Therefore, the present invention preferably employs frequencies based on this type of usage. In one evaluation of this corpus of usage, the frequency of use of letters within each group of letters on a standard keypad were compared with the frequency cited above. The following ordered pairs were found to differ from the above citation, where in each ordered pair the letter with the higher frequency appears first.
(S, R)
(Z, X)
From this data, the ordered sets corresponding to each key, as illustrated in FIGS. 3 and 4, were derived.

It will be appreciated that although only one particular embodiment of the invention has been described in detail, various modifications and improvements can be made by a person skilled in the art without departing from the scope of the present invention. It will also be appreciated that the frequency of use of letters varies in situations where users predominately use languages other than English, or where geographical or cultural differences result in different corpuses of use. In these situations, ordered sets other than those explicitly described, and in accordance with the present invention, may be desirable.

What is claimed is:

1. An apparatus for data entry of at least one of a plurality of letters of an alphabet, the apparatus comprising:
   a plurality of data entry keys;
   a memory having a key mapping, the key mapping representing a correspondence between each of the data entry keys and a corresponding ordered set of at least 3 letters of the plurality of letters, wherein the ordering of letters within each ordered set is at least partly based on a frequency of use of each letter, and wherein each ordered set of at least 3 letters has a corresponding unordered group of letters comprising the at least 3 letters, wherein the group corresponding to each data entry key is at least partly based on an alphabetical ordering of the plurality of letters; and
   a processor coupled to the memory and the plurality of data entry keys, the processor receiving at least one signal representing at least one activation of an activated data entry key of the plurality of data entry keys, the processor determining a selected letter corresponding to a successive one or more activations of the activated data entry key, the determining at least partly based on the key mapping and the at least one signal representing the at least one activation.

2. The apparatus of claim 1, wherein each group of letters comprises letters that are adjacent to each other in the alphabet.

3. The apparatus of claim 1, wherein each data entry key is a numeric data entry key having a unique associated number, and each letter within an ordered set of letters corresponding to each data entry key precedes each letter within an ordered set of letters corresponding to a data entry key having a higher associated number.

4. The apparatus of claim 1, wherein:
   the plurality of data entry keys comprises a first data entry key, a second data entry key, a third data entry key, and a fourth data entry key;
   a group of letters corresponding to the first data entry key comprises the first three letters of the alphabet;
   a group of letters corresponding to the second data entry key comprises the fourth, fifth, and sixth letters of the alphabet;
   a group of letters corresponding to the third data entry key comprises the seventh, eighth, and ninth letters of the alphabet; and
   a group of letters corresponding to the fourth data entry key comprises the tenth, eleventh, and twelfth letters of the alphabet.

5. The apparatus of claim 4, wherein at least one ordered set of letters corresponding to at least one of the first, second, third, and fourth data entry keys is in order of decreasing frequency of use and is not in alphabetical order.

6. The apparatus of claim 4, wherein at least three ordered sets of letters corresponding to at least one of the first, second, third, and fourth data entry keys is in order of decreasing frequency of use and is not in alphabetical order.

7. The apparatus of claim 3, wherein each of at least three ordered sets of letters comprises one ordered pair of letters selected from a group of ordered pairs of letters consisting of an ordered pair C, B, an ordered pair E, D, an ordered pair L, K, an ordered pair O, M, an ordered pair R, P, and an ordered pair I, G, such that the ordering of the selected ordered pair is maintained within the respective ordered set.

8. The apparatus of claim 3, further comprising an indicia for each letter, the indicia for each letter being located in physical association with a corresponding data entry key.

9. The apparatus of claim 3, wherein the determining of a selected letter comprises:
   determining a first letter of a selected ordered set of letters if one activation of the activated data entry key is detected;
   determining a second letter of the selected ordered set of letters if two activations of activated data entry key is detected; and
   determining a third letter of the selected ordered set of letters if two activations of activated data entry key is detected,
   wherein the first letter, second letter, and third letter occupy the first position, second position, and third position, respectively of the selected ordered set of letters.

10. The apparatus of claim 3, further comprising at least 3 data entry keys having a numeric association and an ordered set of letters selected from the group consisting of (2—A, C, B), (3—E, D, F), (4—I, H, G), (5—L, K, J), (6—O, N, M), (7—S, R, P, Q), (8—T, U, V), and (9—Y, W, Z, X), wherein each member of the group represents a number and a corresponding ordered set of letters.

11. The apparatus of claim 10, comprising at least 4 data entry keys having a numeric association and an ordered set of letters selected from the group.

12. The apparatus of claim 3, further comprising a transmitter that transmits a sequence of characters, wherein each character of the sequence of characters is determined by the processor in response to a sequence of activations of the data entry keys.

13. In a device that receives signals from a plurality of input keys, a method of determining a character selected from a plurality of letters of an alphabet, wherein the plurality of letters represent a range of frequency of use, comprising:

receiving at least one signal, each signal representing an activation of an input key of the plurality of input keys, wherein the plurality of letters is greater than the plurality of input keys;

determining whether the at least one signal represents a selected character from the plurality of letters;

determining an activation count corresponding to the input key, based on the at least one signal;

determining the selected character, at least partly based on a combination of the activation count and the input key, and at least partly based on a key mapping of the plurality of input keys, wherein the key mapping associates each input key with a group of at least 3 letters of the plurality of characters, and maps each activation count associated with each input key to a corresponding letter within the group associated with the input key, wherein each group is based on an alphabetical ordering of letters that comprise the group within the alphabet, and wherein each group comprises an ordered set of at least 3 letters, the ordering of letters within each ordered set being at least partly based on the frequency of use of each of the letters within the ordered set, the activation count corresponding to each letter within an ordered set being based on a position of the letter within the ordered set.

14. The method of claim 13, wherein the plurality of input keys comprises 8 numeric input keys and the plurality of characters comprises at least 24 characters.

15. The method of claim 14, wherein each of the numeric input keys is associated with one group selected from a group A, B, C, the group D, E, F, a group, G, H, I, a group J, K, L, a group M, N, O, a group P, R, S, a group T, U, V, and a group W, X, Y.

16. The method of claim 14, wherein an ordered set associated with an input key comprises the ordered set A, C, B.

17. The method of claim 16, wherein an ordered set associated with a second input key comprises the ordered set E, D, F.

18. The method of claim 13, wherein the device is remotely located from the input keys, wherein the receiving at least one signal comprises receiving a wireless transmission of the at least one signal.

19. The method of claim 18, further comprising:

receiving at least one signal representative of the key mapping; and retrieving the key mapping from a plurality of key mappings, based on the signal representative of the key mapping.

20. The method of claim 18, further comprising:

receiving at least one remote signal representative of at least a portion of the key mapping from a first electronic unit comprising the input keys;

receiving at least one remote signal representative of at least a portion of a second key mapping from a second electronic unit comprising a second set of input keys;

receiving a second set of signals from the second electronic unit, the second set of signals indicative of at least one activation of at least one input key from the second set of input keys; and determining a second selected character from the second set of input keys, based on the second set of signals and the second key mapping.

21. An apparatus comprising:

a plurality of input keys, each having at least three associated characters from a plurality of characters;

a processor that detects a set of at least one activation of each input key of the plurality of input keys;

means for determining a selected character from the plurality of characters, the selected character corresponding to an activated input key and the set of at least one activation of the activated input key, the means at least partly based on a frequency of use of each character of the plurality of characters and at least partly based on an alphabetical ordering among all of the characters of the plurality of characters.

22. The apparatus of claim 21, wherein the apparatus comprises a telephone, further comprising:

a plurality of indicia representing the plurality of characters, each indicia located in proximity to an input key of the plurality of input keys; and means for entering a mnemonic telephone number using at least some of the plurality of input keys and at least some of the plurality of indicia.

23. The apparatus of claim 22, wherein the means for determining a selected character comprises a memory having a key mapping that associates each input key with an ordered set of characters from the plurality of characters, the ordering of each of at least 5 ordered sets based on a decreasing order of frequency of each character within the ordered set.

24. A method of facilitating data entry comprising:

providing a plurality of input keys, comprising at least 8 numeric input keys, the at least 8 numeric input keys comprising a "two" key, a "three" key, a "four" key, a "five" key, and a "six" key;

providing a processor coupled to the at least 8 numeric input keys, the processor programmed to interpret a set of activations of each at least 8 numeric input key and to generate a signal representative of a letter based upon each interpretation of each set of activations of each at least 8 numeric input key, the interpretation based on a mapping between the at least 8 numeric input keys, activation counts, and letters;

wherein the mapping comprises at least four associations selected from the group consisting of the associations in the following table, wherein each row represents associations between a numeric input key, an activation count, and a letter:

| Numeric Input Key | Activation Count | Letter |
| --- | --- | --- |
| "two" | 1 | A |
| "two" | 2 | C |
| "two" | 3 | B |
| "three" | 1 | E |
| "three" | 2 | D |
| "three" | 3 | F |
| "four" | 1 | I |
| "four" | 3 | G |
| "five" | 1 | L |

25. An apparatus for data entry of characters selected from a plurality of characters, wherein each of the plurality of characters has a corresponding probability of usage, the apparatus comprising:

a plurality of data entry keys arranged in an ordered sequence, wherein the plurality of data entry keys number less than the plurality of characters; and a plurality of indicia representing the plurality of characters, wherein each of the plurality of characters has a corresponding indicia, the plurality of indicia being arranged in a plurality of indicia groups, each of the plurality of indicia groups being located in a physical association with a corresponding one of the plurality of data entry keys, each of the plurality of indicia groups corresponding to a data entry key such that the indicia groups are in an alphabetical ordering relative to each other, wherein the plurality of indicia in the plurality of indicia groups are arranged in a predetermined activation sequence, and wherein a first indicia in the predetermined activation sequence in each of at least four of the plurality of indicia groups corresponds to a first character having a higher probability of usage than a second character of the plurality of characters corresponding to a second, and any subsequent, indicia in the predetermined activation sequence.

26. An apparatus in accordance with claim 25 wherein each of the indicia represent a letter of an alphabet, and wherein the plurality of indicia groups comprise indicia groups corresponding to the group of letters A, B, C, the group of letters D, E, F the group of letters G, H, I, the group of letters J, K, L, the group of letters M, N, O, the group of letters, P, R, S, the group of letters T, U, V, and the group of letters W, X, Y.

27. An apparatus in accordance with claim 26 wherein activation of each data entry key corresponding to an activated letter causes a corresponding DTMF signal to be generated, wherein the corresponding DTMF signal for each activated letter is a standard DTMF signal used in telephones.

28. An apparatus in accordance with claim 26, further comprising a plurality of numeric indicia, each numeric indicia representing a numeric digit between 0 and 9 inclusive, wherein each activation sequence comprises one numeric digit in a position greater than the third position of the activation sequences.

29. The apparatus of claim 28 wherein each indicia group of the plurality of indicia groups comprises at least three letters of the alphabet.

30. The apparatus of claim 26, wherein an activation sequence corresponding to the indicia group A, B, C comprises an activation sequence A, C, B, and an activation sequence corresponding to the indicia group D, E, F comprises an activation sequence E, D, F.

31. The apparatus of claim 26, further comprising:
a memory for storing the association between each of the plurality of data entry keys and the plurality of indicia in the predetermined activation sequence in the each of the plurality of indicia groups.

32. The apparatus of claim 31, further comprising a controller coupled to the plurality of data entry keys and coupled to the memory, wherein the controller comprises a detector for detecting when one of the plurality of data entry keys is activated by a user once, and the controller having an output for providing a first signal indicating a first of the plurality of characters represented by a first indicia in the predetermined activation sequence associated with the one of the plurality of data entry keys is selected by the user, and the detector for detecting when the one of the plurality of data entry keys is activated by the user twice, and the controller for providing a second signal indicating a second of the plurality of characters represented by a second indicia in the predetermined activation sequence associated with the one of the plurality of data entry keys is selected by the user.

33. A method for providing a data entry apparatus for entering alphanumeric characters from a plurality of alphanumeric characters, comprising:
a) providing a plurality of data entry keys for user entry of the plurality of alphanumeric characters, wherein each of the plurality of data entry keys is configured to have an activation sequence comprising at least 3 letters of an alphabet, each letter having a corresponding frequency of use, wherein the at least 3 letters of each activation sequence are consecutive letters of the alphabet;
b) determining the frequency of use of each of the at least 3 letters within each activation sequence; and
c) ordering each character activation sequence in descending order of the frequency of use of the at least 3 letters that comprise the character activation sequence.

34. The method of claim 33 wherein the plurality of alphanumeric characters comprises the letters A to Z and the numeric digits 0 to 9, and the position of each numeric digit within its respective activation sequence is not determined by a frequency of use of the numeric digit.

35. The method of claim 34 wherein providing a plurality of data entry keys comprises providing at least 8 data entry keys.

36. The method of claim 33 wherein ordering each character activation sequence comprises including at least a selected one ordered pair from a group of ordered pairs consisting of an ordered pair C, B, an ordered pair E, D, an ordered pair I, G, an ordered pair L, K, and an ordered pair S, P within respective activation sequences such that the ordering of the at least one selected ordered pair is maintained within the activation sequence.

37. The method of claim 36 wherein ordering each character activation sequence comprises including at least two selected ordered pairs from the group of ordered pairs within respective activation sequences such that the ordering of the at least one selected ordered pair is maintained within the activation sequence.

38. A method comprising:
a) detecting a first activation of an input key of an electronic device;
b) generating a first signal representative of a first letter corresponding to the first activation of the input key;
c) detecting a second activation of the input key;
d) generating a second signal representative of a second letter corresponding to the second activation of the input key, the second letter being a less frequently used letter than the first letter;
e) detecting a third activation of the input key;
d) generating a third signal representative of a third letter corresponding to the third activation of the input key, the third letter being a less frequently used letter than the second letter;
wherein the first letter, second letter, and third letters are all consecutive letters of an alphabet, and the ordered set of first letter, second letter, third letter is not in alphabetical order.

39. The method of claim 38, wherein the ordered set of first letter, second letter, and third letter is an ordered set selected from the group consisting of an ordered set of A, C, B and an ordered set of E, D, F.

40. The method of claim 38, further comprising:
detecting a fourth activation of the input key; and
generating a signal representative of a digit corresponding to the fourth activation of the input key.

41. The method of claim 40, wherein the first letter is the letter "E", the second letter is the letter "D", the third letter is the letter "F", and the digit is the digit "3".

42. The method of claim 41, wherein the ordered set of the first letter, the second letter, and the third letter comprise a letter "S" and a letter "P", and the letter "S" occurs before the letter "P".

43. The method of claim 38, further comprising:

determining whether the electronic device is in a numeric mode of operation;

detecting an activation of the input key in numeric mode; and in response to the activation of the input key in numeric mode, generating a DTMF signal associated with the first letter, the second letter, and the third letter, in accordance with a standard association.

44. A data entry keypad comprising eight data entry keys, each data entry key having an associated group of letters of an alphabet of a plurality of groups of letters of an alphabet, the plurality of groups of letters comprising the group A, B, C, the group D, E, F, the group G, H, I, the group J, K, L, the group M, N, O, the group P, R, S, the group T, U, V, and the group, W, X, Y, wherein the letters within each group of letters is ordered by decreasing order of frequency of use, the ordering corresponding to an activation sequence associated with the corresponding data entry key.

* * * * *

UNITED STATES PATENT AND TRADEMARK OFFICE
CERTIFICATE OF CORRECTION

PATENT NO. : 6,643,371 B2
DATED : November 4, 2003
INVENTOR(S) : Mager

It is certified that error appears in the above-identified patent and that said Letters Patent is hereby corrected as shown below:

Title page,
Item [57], ABSTRACT,
Line 15, "keys and, letters" should read -- keys, and letters --.

Column 2,
Line 6, "a full sized keyboard" should read -- a full-sized keyboard --.

Column 5,
Line 63, "pre-assigned" should read -- preassigned --.

Column 7,
Line 27, "pre-programmed" should read -- preprogrammed --.

Column 11,
Lines 35-36, "different corpuses" should read -- different corpora --.

Column 12,
Line 51, "position, respectively of" should read -- position, respectively, of --.

Column 15,
Line 24, "F the group" should read -- F, the group --.

Signed and Sealed this

Eighth Day of March, 2005

JON W. DUDAS
*Director of the United States Patent and Trademark Office*